3,361,804
PURIFICATION OF TEREPHTHALIC ACID
Jacob Alagy, La-Celle-Saint-Cloud, France, assignor to Institut Francais du Pétrole, des Carburants et Lubrifiants, Rueil-Malmaison, France
No Drawing. Filed May 11, 1965, Ser. No. 454,974
Claims priority, application France, May 13, 1964, 974,415
20 Claims. (Cl. 260—525)

This invention relates to a process for the purification of terephthalic acid.

When terephthalic acid is utilized for the production of condensation polymers, such as the polyterephthalic acid ester of ethylene glycol, it is necessary for the acid to be in a highly purified form. Actually, though, the conventional process for the production of terephthalic acid by liquid phase oxidation of dialkyl benzenes, particularly paraxylene, in the presence of heavy metal salt catalysts, does not yield a sufficiently pure product. Consequently, it is necessary to submit the impure product to rather complex and costly purification steps which nevertheless do not always result in a product that is as pure as desired.

A principal object of this invention, therefore, is to provide an improved process for the purification of terephthalic acid.

Upon further study of the specification and claims, other objects and advantages of the present invention will become apparent.

To attain the objects of this invention, there is provided a process comprising the following steps:

(a) Forming an aqueous solution of a dibasic salt of terephthalic acid, for example, a solution of diammonium terephthalate or dialkali metal terephthalate, preferably the disodium or dipotassium salt.

(b) Treating the resulting aqueous solution with a strong oxidizing agent such as, preferably, a permanganate, or hypochlorite, preferably the alkali metal salts, thereof. Other oxidizing agents do not provide so good results and are thus less preferred.

(c) Vaporizing an aqueous portion of the resulting solution, for example, at least 1%, and preferably 2–30%, by volume of the solution.

(d) Reacting the resultant solution with a strong acid, preferably a mineral acid, to liberate terephthalic acid from its salt. By strong acid is meant an acid which has a higher dissociation constant than terephthalic acid.

This purification process yields terephthalic acid of sufficiently high purity, e.g., 99.9%, for direct use as monomer in a polycondensation reaction. However, if even higher purities are desired, the process can be repeated.

To obtain the desired purification, it is in generally necessary to evaporate at least 1% of the solution, as set forth in step (c). On the other hand, if more than 30% by volume of the water is evaporated, there is no particular increase in the extent of purification, but of course the cost of the process is substantially increased.

Each step of this process is important to obtain solid terephthalic acid of high purity. Particular attention, however, is directed to the evaporation step which serves to eliminate impurities which have been found to be separable only with substantial difficulty by other methods. This vaporization step entrains the impurities; however, without the oxidation step, the vaporization step is not completely effective.

In general, the preceding description of the invention describes the process adequately. For the purpose of achieving the best results, however, the following preferred conditions are submitted. It is to be understood, though, that these preferred conditions are not intended to be limitative of the broad aspects of the invention:

The preferred concentration of the dibasic salt of terephthalic acid in the aqueous solution is 2–20% by weight (expressed as the acid) of the total solution, and it is desirable in this connection for the salt to have a concentration which is near the saturation point. It is also to be noted that there is no disadvantage in employing an excess of the base which is used to neutralize the acid to form the salt.

It is preferred that the quantity of oxidizing agent is 0.1–30% by weight, based on the crude terephthalic acid. It is even more beneficial if the concentration is 0.5–5% by weight.

The most preferred oxidizing agent is an alkali metal permanganate, such as, for example, sodium, potassium, or lithium permanganate.

As a preferred supplementary step, it is desirable to remove any suspended solids which are present in the aqueous solution of the terephthalic acid salt. This can be accomplished by any conventional method, such as filtration or centrifugation, and can be conducted either before or preferably after the evaporation step, but in any case before the final acidification step wherein the terephthalic acid is precipitated.

The evaporation of at least a portion of the water from the aqueous solution of the terephthalic acid salt can be conducted by simple distillation or with the aid of a carrier gas, preferably an inert gas, such as air, nitrogen, or even water vapor. (In this connection, by "inert" is meant a gas that does not react with any of the reactants under the conditions of the reaction.) If water vapor is used as the entraining or carrier gas, the volume of solution can remain constant without any disadvantage, or for that matter can even be increased during the course of the process; this is due to the fact that the evaporated water can be replaced by condensed carrier gas. In such a process, the percentage of evaporation of the aqueous solution is expressed as the ratio of the volume of distilled water to the initial volume of solution.

With respect to the timing of the evaporation step, it is possible to conduct it simultaneously with the oxidation step, or subsequent to the oxidation step.

For the acidification step, the preferred acids are mineral acids, such as sulfuric acid, hydrochloric acid, phosphoric acid, or nitric acid. The resultant pure terephthalic acid is then recovered, preferably by filtration or centrifugation. Finally, the terephthalic acid product is preferably washed with water until the pH of the wash water is substantially neutral, thereby assuring the removal of residual mineral acid.

Although these specified steps of oxidation and evaporation can be conducted at ambient temperatures, for example at about 20° C. or at a lower temperature, it is preferred to employ elevated temperatures, preferably 50–200° C. and, of particular advantage, between 70 and 125° C.

Temperatures may be same or different in the oxidation and evaporation steps.

The reaction pressure is selected so that at least a portion of the aqueous solution of terephthalic acid is maintained in the liquid phase.

The mother liquor separated from the purified terephthalic acid can be cooled, for example to ambient temperature, and then subjected to filtration to separate further acid which has crystallized out. The residual mother liquor can then be concentrated by evaporation to remove the salt formed by the reaction of the mineral acid and the alkali metal base. This latter salt can be economically valuable, for example as a fertilizer, particularly when the salt is an ammonium or a potassium salt.

As another use for the mother liquor, it is advantageous to employ it as the dissolving medium for the raw terephthalic acid, and to this medium would be added the necessary quantities of the ammonia or alkali metal base. By conducting the operation in this particular manner, the mother liquor will thus be enriched in the mineral salt, thereby facilitating recovery of such salt and obtaining the benefit of the concomitant economic advantages thereof.

It is also to be understood that the purification process of this invention can be further supplemented by the addition of other purifying steps. For example, the aqueous solution of the terephthalic acid salt can be treated with an adsorption agent in order to remove organic coloring matter and the like. Such adsorption agents are well known in the art, the most common being activated carbon black.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

At a temperature of 100° C., there is dissolved terephthalic acid having a purity of 98.8%, as obtained by the oxidation of xylene. The dissolution of the acid is accomplished by adding the stoichiometric quantity of an aqueous sodium hydroxide solution (2 mols of sodium hydroxide per mol of acid). By controlling the quantity of water utilized, there is obtained a 5% by weight (expressed as terephthalic acid) aqueous solution of disodium terephthalate. To this solution there is added 2% by weight of potassium permanganate, based on the starting terephthalic acid, and the resultant solution is refluxed for about 30 minutes.

The hot solution is then filtered, and evaporated to an extent that 5% by volume of the water is removed, the evaporation step being maintained at a temperature of about 100° C. Thereupon, the remaining unevaporated solution is acidified by the addition of sulfuric acid, while the solution is strongly agitated. After the precipitation of terephthalic acid is completed, the suspension is filtered at a temperature of about 100° C. To the terephthalic acid remaining on the filter, boiling wash water is added until the wash liquors exhibit a substantially neutral pH.

By this process there is recovered a terephthalic acid having a purity higher than 99.9%; and of most importance, it is usable directly as a reactant in a polycondensation reaction, for example with ethylene glycol. By such a polycondensation reaction, there is produced a colorless polymer.

In this particular example, the resulting purified terephthalic acid is perfectly white. However, in some cases, the raw terephthalic acid is strongly colored, and in such a case it is of advantage to interpose a decolorization step by treating the aqueous solution of the terephthalic acid salt with, for example, activated carbon.

The above example can be repeated with equivalent results, if instead of a 5% evaporation of water the following percentages of evaporation are employed:

2%, 10%, 30% and 50%

On the other hand, when the preceding example is repeated, and only 0.5% of the water is evaporated, the resultant purity of the acid is only 99.7%, which, though it may seem to be relatively pure, is still undesirably low for subsequent reactions of the terephthalic acid.

*Example 1a*

For purposes of comparison, Example 1 is repeated, except that the evaporation step is completely omitted. The resultant purity of the acid is only 99.5%. This acid is white, but the polycondensation product produced by the reaction of the acid with ethylene glycol is colored, which, of course, constitutes a very serious problem when there is an attempt to market the final product to textile manufacturers and the like.

*Examples 2–4*

Example 1 is repeated with the following exceptions; and the same advantageous results are obtained:

(a) Ammonia is employed as the base and nitric acid as the acid.

(b) Potassium hydroxide is employed as the base and hydrochloric acid as the acid.

(c) Sodium hydroxide is employed as the base and phosphoric acid as the acid.

*Example 5*

Example 1 is repeated with the exception that the potassium permanganate is replaced by sodium hypochlorite in a concentration of 5% by weight of the initial terephthalic acid. Again, there is obtained an acid which upon reaction with ethylene glycol yields a colorless polycondensation product.

The preceding examples can be repeated with similar success by substituting the generically and specifically described reactants and operating conditions of this invention for those used in the preceding examples.

This invention is particularly applicable to the purification of terephthalic acid as produced by the process described in the invention entitled Process for the Production of Terephthalic Acid, U.S. patent application S.N. 336,638, filed Jan. 9, 1964.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the purification of terephthalic acid, comprising the steps of:
   (a) dissolving raw terephthalic acid in water in the form of a dibasic salt of a cation selected from the group consisting of ammonium and an alkali metal;
   (b) oxidizing the resulting aqueous solution of the terephthalic acid salt with a strong oxidizing agent;
   (c) evaporating a volume of water from the aqueous solution of the terephthalic acid salt to an extent of at least 1% by volume, this step being conducted not before step (b);
   (d) acidifying the resultant remaining solution to precipitate solid terephthalic acid; and
   (e) separating purified precipitated terephthalic acid from its mother liquor.

2. A process as defined by claim 1, wherein the reaction temperatures of steps (b) and (c) are 20–200° C.

3. A process as defined by claim 1 wherein the reaction temperatures of steps (b) and (c) are 70–125° C.

4. A process as defined by claim 1 wherein the oxidizing agent is employed in a ratio of 0.1 to 30% by weight based on the initial terephthalic acid.

5. A process as defined by claim 1 wherein the oxidizing agent is employed in a ratio of 0.1 to 30% by weight based on the initial terephthalic acid.

6. A process as defined by claim 1 wherein the oxidizing agent is an alkali metal permanganate.

7. A process as defined by claim 3 wherein the oxidizing agent is an alkali metal permanganate.

8. A process as defined by claim 4 wherein the oxidizing agent is an alkali metal permanganate.

9. A process as defined by claim 1 wherein the quantity by volume of evaporated water constitutes 2–30% by volume of the original solution.

10. A process as defined by claim 3 wherein the quantity by volume of evaporated water constitutes 2—30% by volume of the original solution.

11. A process as defined by claim 4 wherein the quantity by volume of evaporated water constitutes 2–30% by volume of the original solution.

12. A process as defined by claim 5 wherein the quantity by volume of evaporated water constitutes 2–30% by volume of the original solution.

13. A process as defined by claim 6 wherein the quantity by volume of evaporated water constitutes 2–30% by volume of the original solution.

14. A process as defined by claim 7 wherein the quantity by volume of evaporated water constitutes 2–30% by volume of the original solution.

15. A process as defined by claim 8 wherein the quantity by volume of evaporated water constitutes 2–30% by volume of the original solution.

16. A process as defined by claim 1, comprising the further step of washing the obtained purified precipitated terephthalic acid with water at a temperature of 50–200° C.

17. A process as defined by claim 15, comprising the further step of washing the obtained purified precipitated terephthalic acid with water at a temperature of 50–200° C.

18. A process as defined by claim 1 wherein the mother liquor separated from the precipitated terephthalic acid in step (e) is employed as dissolving solution in step (a).

19. A process as defined by claim 16 wherein the mother liquor separated from the precipitated terephthalic acid in step (e) is employed as dissolving solution in step (a).

20. A process as defined by claim 17 wherein the mother liquor separated from the precipitated terephthalic acid in step (e) is employed as dissolving solution in step (a).

References Cited
UNITED STATES PATENTS 2,899,466  8/1959  O'Neill _____ 260—525
3,047,621  7/1962  Tate _____ 260—525

LORRAINE A. WEINBERGER, *Primary Examiner.*

S. WILLIAMS, *Assistant Examiner.*

UNITED STATES PATENT OFFICE
CERTIFICATE OF CORRECTION

Patent No. 3,361,804                      January 2, 1968

Jacob Alagy

It is certified that error appears in the above identified patent and that said Letters Patent are hereby corrected as shown below:

Column 4, line 64, the claim reference numeral "1" should read -- 3 --.

Signed and sealed this 19th day of August 1969.

(SEAL)
Attest:

Edward M. Fletcher, Jr.            WILLIAM E. SCHUYLER, JR.
Attesting Officer                    Commissioner of Patents